(12) United States Patent
Song et al.

(10) Patent No.: US 12,724,768 B2
(45) Date of Patent: Sep. 1, 2026

(54) METHOD FOR SEARCHING FOR RELATED PATENT BY USING CLINICAL TRIAL DESIGN DATA BASED ON LARGE LANGUAGE MODEL

(71) Applicant: MEDIAIPLUS CO., LTD., Seongnam-si (KR)

(72) Inventors: Nam Goo Song, Suwon-si (KR); Ji Hee Jung, Seoul (KR)

(73) Assignee: MEDIAIPLUS CO., LTD., Seongnam-si (KR)

( * ) Notice: Subject to any disclaimer, the term of this patent is extended or adjusted under 35 U.S.C. 154(b) by 0 days.

(21) Appl. No.: 18/959,850

(22) Filed: Nov. 26, 2024

(65) Prior Publication Data

US 2025/0174363 A1 May 29, 2025

(30) Foreign Application Priority Data

Nov. 29, 2023 (KR) ........................ 10-2023-0169140

(51) Int. Cl.
*G06F 16/00* (2019.01)
*G06F 16/242* (2019.01)

(52) U.S. Cl.
CPC ................................ *G06F 16/2443* (2019.01)

(58) Field of Classification Search
CPC .................................................. G06F 16/2443
See application file for complete search history.

(56) References Cited

U.S. PATENT DOCUMENTS

2017/0308557 A1* 10/2017 Cassidy ................. G06N 20/00
2020/0356595 A1* 11/2020 Kim .................... G06F 16/9038
2023/0290461 A1* 9/2023 Kong ..................... G16H 30/40
2023/0317215 A1* 10/2023 Ghosh .................... G16H 10/20 705/2
2024/0194308 A1* 6/2024 Ikeguchi ................ G16H 10/60
2024/0330345 A1* 10/2024 Kohli .................... G06F 40/247
2025/0046407 A1* 2/2025 Santiago ................ G16H 50/20

FOREIGN PATENT DOCUMENTS

KR 10-2010-0059516 A 6/2010
KR 10-2021-0152126 A 12/2021
KR 10-2021-0153912 A 12/2021

* cited by examiner

*Primary Examiner* — Syed H Hasan
(74) *Attorney, Agent, or Firm* — Bridgeway IP Law Group, PLLC; Jihun Kim

(57) ABSTRACT

A method for searching for a related patent by using clinical trial design data based on a large language model (LLM), which is performed by a server, includes receiving a clinical trial-related keyword from a user device, searching for a plurality of pieces of clinical trial design data and providing the searched data, providing the user device with detailed information about the selectively input clinical trial design data, receiving a category of a main keyword from the user device and extracting a main keyword corresponding to the category from the detailed information, pre-processing the extracted main keyword, combining a plurality of pieces of pre-stored query text to generate a plurality of pieces of final query text and inputting the final query text to the LLM to search for and collect a plurality of related patents, and generating a report and providing the report to the user device.

11 Claims, 6 Drawing Sheets

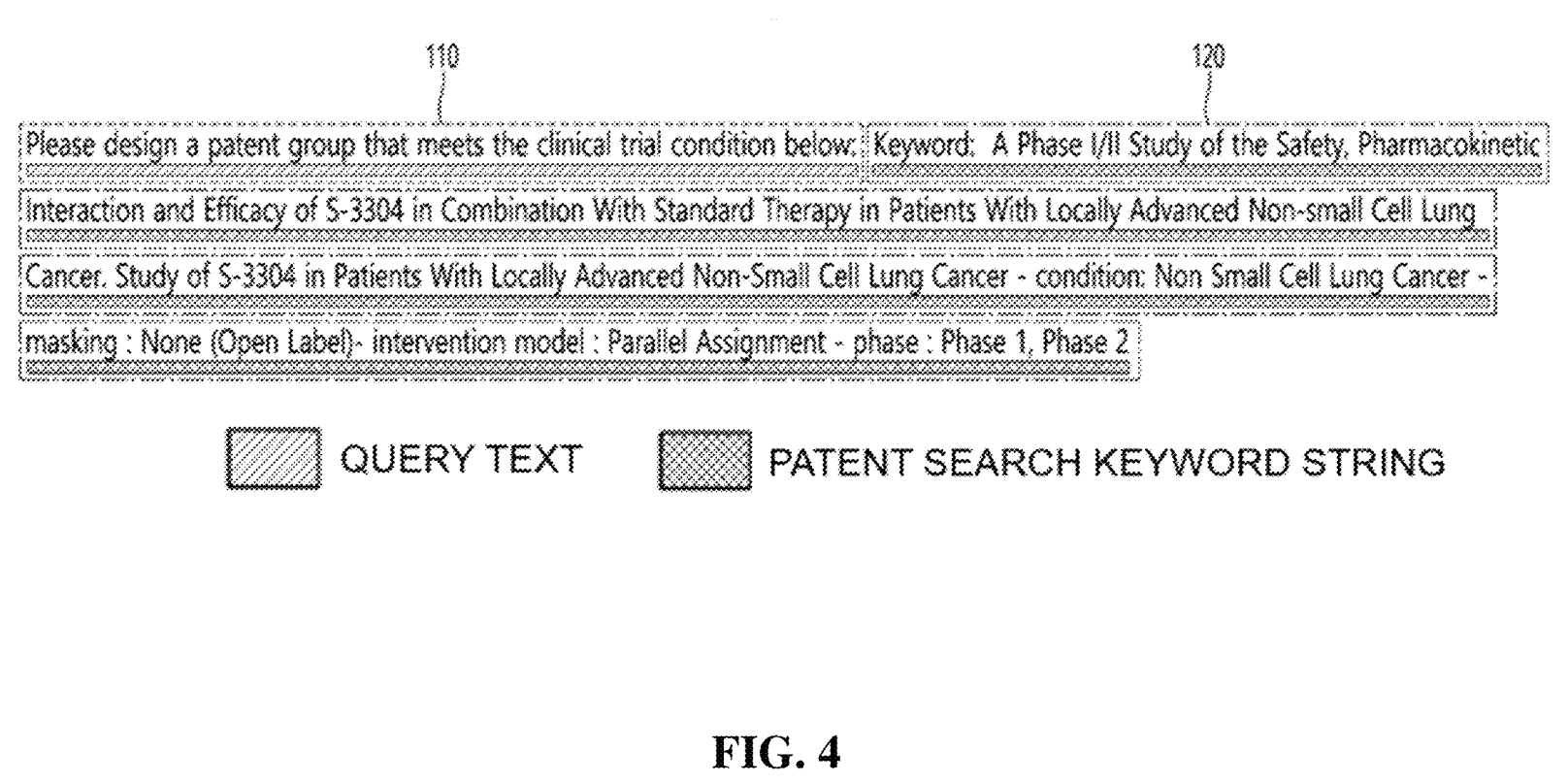

110

120

Please design a patent group that meets the clinical trial condition below: Keyword: A Phase I/II Study of the Safety, Pharmacokinetic Interaction and Efficacy of S-3304 in Combination With Standard Therapy in Patients With Locally Advanced Non-small Cell Lung Cancer. Study of S-3304 in Patients With Locally Advanced Non-Small Cell Lung Cancer - condition: Non Small Cell Lung Cancer - masking : None (Open Label)- intervention model : Parallel Assignment - phase : Phase 1, Phase 2

QUERY TEXT

PATENT SEARCH KEYWORD STRING

FIG. 4

| Country | Invention Name | Application No | Application Date | Applicant |
|---|---|---|---|---|
| US | Diagnosing predisposition to fat deposition and therapeutic methods for reducing fat deposition and treatment of associated conditions | 10455552 | 2003-06-04 | |
| US | Therapeutic methods for reducing fat deposition and treating associated conditions | 10607806 | 2003-06-27 | Gail Isabel Reid Adam, Maria L. Langdown, Mikhail F. Denissenko, Edward A. Dennis, Charles Cantor, Byron Rubin |
| US | Diagnosing predisposition to fat deposition and associated conditions | 10608296 | 2003-06-27 | Gail Isabel Reid Adam, Maria L. Langdown |
| US | Microorganism implicated in intestinal diseases, alzheimer's disease and other diseases | 10787860 | 2004-02-25 | |
| US | Methods of increasing insulin sensitivity or decreasing insulin secretion by administering corticotiopin releasing factor receptor-2 inhibitors | 11668047 | 2007-01-29 | Alon M. Chen, Kuo-Fen Lee, Chien Li, Wylie W. Vale |
| US | Treatment for nicotine-induced lung disease using peroxisome proliferator-activated receptor gamma agonists | 12296656 | 2007-04-10 | Virender K. Rehan, John S. Torday |

FILING COUNTRY INVENTION NAME APPLICATION NUMBER APPLICATION DATE APPLICANT

METHOD FOR SEARCHING FOR RELATED PATENT BY USING CLINICAL TRIAL DESIGN DATA BASED ON LARGE LANGUAGE MODEL

CROSS-REFERENCE TO RELATED APPLICATION

This application claims the benefit under 35 USC 119(a) of Korean Patent Applications No. 10-2023-0169140 filed on Nov. 29, 2023, in the Korean Intellectual Property Office, the entire disclosures of which are incorporated herein by reference for all purposes.

TECHNICAL FIELD

The present disclosure relates to a method for searching for a related patent by using clinical trial design data based on a large language model, and more particularly, to a method and system for searching for a patent highly related to clinical trial design data input based on a large language model that has been trained with patent search keywords and a plurality of pieces of information related to new drug development.

BACKGROUND

Recently, as diseases induced by various mutant viruses have become rampant, the research and development of new drugs has been actively undertaken to cope with these diseases and numerous patents have been granted for the research and development of new drugs.

In general, patents related to the research and development of new drugs include descriptions of clinical trial processes performed during the development of new drugs. In most cases, the descriptions pertain to clinical trial processes performed by Contract Research Organizations (CROs) at the request of pharmaceutical companies conducting research and development of new drugs.

Accordingly, there is a growing need for a technology to easily and quickly search for a patent including descriptions of a clinical trial just with information about a new drugs recently being filed for patents and basic clinical trial information and thus to quickly and accurately search for the patent just with predetermined information about the clinical trial conducted for new drug development.

SUMMARY

In view of the foregoing, the present disclosure is conceived to provide a method and system for searching for a related patent by using clinical trial design data based on a large language model.

However, the problems to be solved by the present disclosure are not limited to the above-described problems. Although not described herein, other problems to be solved by the present disclosure can be clearly understood by a person with ordinary skill in the art from the following descriptions.

An aspect of the present disclosure provides a method for searching for a related patent by using clinical trial design data based on a large language model (LLM), which is performed by a server, including: (a) a process of receiving a clinical trial-related keyword from a user device, searching for a plurality of pieces of clinical trial design data based on the related keyword, and providing the searched data; (b) when one of the plurality of pieces of clinical trial design data is selectively input from the user device, a process of providing the user device with detailed information about the selectively input clinical trial design data; (c) a process of receiving a category of a main keyword from the user device and extracting a main keyword corresponding to the category from the detailed information about the clinical trial design data; (d) a process of pre-processing the extracted main keyword, combining a plurality of pieces of pre-stored query text to generate a plurality of pieces of final query text, and inputting the final query text to the LLM to search for and collect a plurality of related patents; and (e) a process of generating a report in which the plurality of related patents collected is output for a plurality of sections, respectively, and providing the report to the user device.

Also, the clinical trial design data includes report files, image files, and video files directly input from the user device, or report files, image files, and video files on a plurality of clinical trials collected via internet crawling based on the clinical trial-related keyword input from the user device.

Further, the process (d) includes: a process of removing a special character from a string including the main keyword, and if the string including the main keyword contains English characters, converting capital letters into small letters and extracting the string as a patent search keyword string.

Furthermore, the category of the main keyword includes a drug name, a Contract Research Organization name, and a disease name.

Moreover, the process (c) includes: a process of receiving the category of the main keyword from the user device, extracting the main keyword corresponding to the category from the detailed information about the clinical trial design data to recommend it to the user device, and selectively inputting, by the user device, one of recommended main keywords to determine the selected main keyword as a main keyword used for patent search.

Also, the sections include a filing country, an invention name, an application number, an application date, and an applicant.

Further, in the process (e), the generated report is provided in a program format that allows for editing and saving on a webpage or application.

Furthermore, before the process (a), the method further includes: (a-1) a process of receiving a plurality of pieces of patent document data about a clinical trial from the user device; (a-2) a process of extracting a query information string including a clinical trial title, a disease name, information about a clinical trial phase, clinical trial patient recruitment criteria, and clinical trial patient group design information, and a response information string including claims of a patent document, description of the invention of the patent document, patent bibliographic data, and a patent number from the plurality of pieces of patent document data, and generating a prompt command by using the pre-stored query text, the query information string, and the response information string; and (a-3) a process of matching the prompt command with the query information string and the response information string to create a training dataset and adjusting parameters of the LLM by training the LLM with the training set.

The method further includes: (a-4) a process of performing validation by setting patent document data for validation as a separate validation dataset among the plurality of pieces of patent document data set by a user, training the LLM with the validation dataset, and adjusting the parameters of the LLM.

Moreover, the prompt command includes query text and a clinical trial main keyword, and the query text is located before the clinical trial main keyword.

Also, the query text consists of a query or command to search for a patent with specific contents by using the clinical trial main keyword, which sequentially lists information input by the user.

Further, the process (c) further includes: a process of analyzing a meaning of a string even when the user device inputs a plurality of strings without spaces, extracting main keywords corresponding to a title, a drug name, formulation, a target disease, and a clinical trial phase, respectively, from the string, and providing the user device with the strings with line spacing to distinguish categories of the title, the drug name, the formulation, the target disease, and the clinical trial phase, respectively, to query again whether it has been intended by the user.

Another aspect of the present disclosure provides a server for searching for a related patent by using clinical trial design data based on an LLM, including: a memory that stores a program configured to perform a method for searching for the related patent by using the clinical trial design data based on the LLM; and a processor that executes the program, and the method includes: (a) a process of receiving a clinical trial-related keyword from a user device, searching for a plurality of pieces of clinical trial design data based on the related keyword, and providing the searched data; (b) when one of the plurality of pieces of clinical trial design data is selectively input from the user device, a process of providing the user device with detailed information about the selectively input clinical trial design data; (c) a process of receiving a category of a main keyword from the user device and extracting a main keyword corresponding to the category from the detailed information about the clinical trial design data; (d) a process of pre-processing the extracted main keyword, combining a plurality of pieces of pre-stored query text to generate a plurality of pieces of final query text, and inputting the final query text to the LLM to search for and collect a plurality of related patents; and (e) a process of generating a report in which the plurality of related patents collected is output for a plurality of sections, respectively, and providing the report to the user device.

According to an embodiment of the present disclosure, a method and system for searching for a related patent by using clinical trial design data based on an LLM makes it possible to easily and quickly search for a patent related to new drug development just with new drug information and basic clinical trial information.

Also, it is possible to acquire intellectual property information in the fast evolving field of new drug development, replace a conventional complex keyword search method, and reduce the time and cost required to search for a patent related to new drug development. Therefore, the time and cost conventionally required can be invested in other business areas.

BRIEF DESCRIPTION OF THE DRAWINGS

In the detailed description that follows, embodiments are described as illustrations only since various changes and modifications will become apparent to a person with ordinary skill in the art from the following detailed description. The use of the same reference numbers in different FIGS. indicates similar or identical items.

FIG. 4 shows an example of query text and a patent search keyword string according to an embodiment of the present disclosure.

FIG. 5 shows an example of a report and sections includes in the report according to an embodiment of the present disclosure.

DETAILED DESCRIPTION

Figure 1:
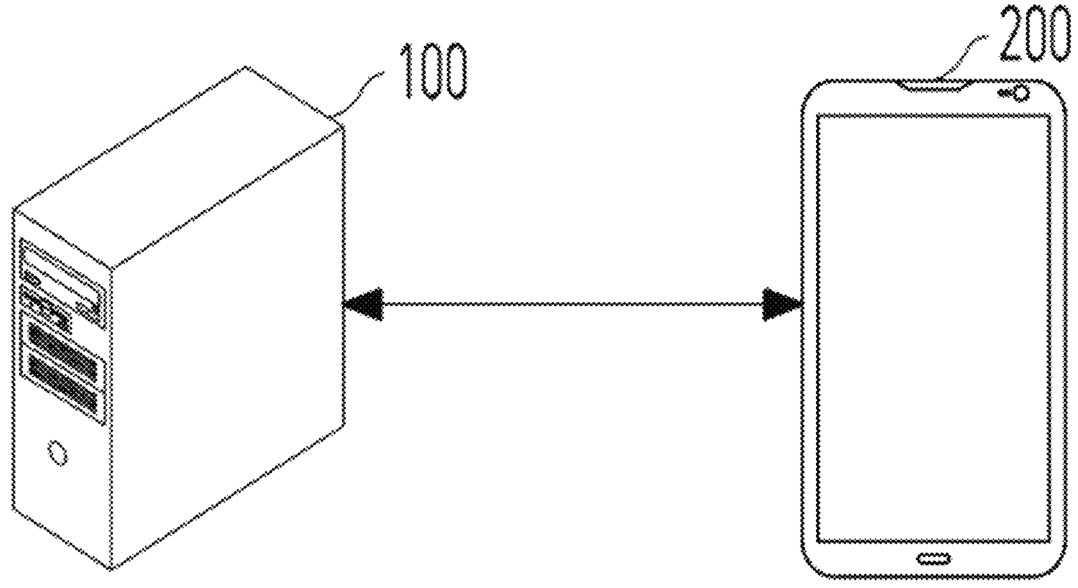
FIG. 1 is a structure diagram of a system for searching for a related patent by using clinical trial design data based on an LLM according to an embodiment of the present disclosure.

Hereafter, embodiments will be described in detail with reference to the accompanying drawings so that the present disclosure may be readily implemented by a person with ordinary skill in the art. However, it is to be noted that the present disclosure is not limited to the embodiments but can be embodied in various other ways. In the drawings, parts irrelevant to the description are omitted for the simplicity of explanation, and like reference numerals denote like parts through the whole document.

Throughout this document, the term "connected to" may be used to designate a connection or coupling of one element to another element and includes both an element being "directly connected to" another element and an element being "electronically connected to" another element via another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

Throughout the whole document, the term "unit" includes a unit implemented by hardware, a unit implemented by software, and a unit implemented by both of them. One unit may be implemented by two or more pieces of hardware, and two or more units may be implemented by one piece of hardware. Meanwhile, the units are not limited to the software or the hardware, and each of the units may be stored in an addressable storage medium or may be configured to implement one or more processors. Accordingly, the units may include, for example, software, object-oriented software, classes, tasks, processes, functions, attributes, procedures, sub-routines, segments of program codes, drivers, firmware, micro codes, circuits, data, database, data structures, tables, arrays, variables and the like. The components and the functions of the units can be combined with each other or can be divided up into additional components and units. Further, the components and the "units" may be configured to implement one or more CPUs in a device or a secure multimedia card.

The term "device" to be described below may be implemented with computers or portable devices which can access a server or another device through a network. Herein, the computers may include, for example, a notebook, a desktop, a laptop, and a VR HMD (e.g., HTC VIVE, Oculus Rift, GearVR, DayDream, PSVR, etc.) equipped with a WEB browser. Herein, the VR HMD includes all of models for PC (e.g., HTC VIVE, Oculus Rift, FOVE, Deepon, etc.), mobile (e.g., GearVR, DayDream, Baofeng Mojing, Google Cardboard, etc.) and console (PSVR), and stand-alone models (e.g., Deepon, PICO, etc.). The portable devices are, for example, wireless communication devices that ensure portability and mobility and may include a smart phone, a tablet PC, a wearable device and various kinds of devices equipped with a communication module such as Bluetooth (BLE, Bluetooth Low Energy), NFC, RFID, ultrasonic waves, infrared rays, WiFi, LiFi, and the like. Further, the term "network" refers to a connection structure that enables information exchange between nodes such as devices, servers, etc. and includes LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The present disclosure relates to a method and system for searching for a related patent by using clinical trial design data based on an LLM, and more particularly, to a technology of searching for a patent highly related to clinical trial design data input based on an LLM that has been trained with patent search keywords and a plurality of pieces of information related to new drug development.

Referring to FIG. 1, the system for searching for a related patent by using clinical trial design data based on an LLM according to an embodiment of the present disclosure is composed of a server 100 and a user device 200.

Figure 2:
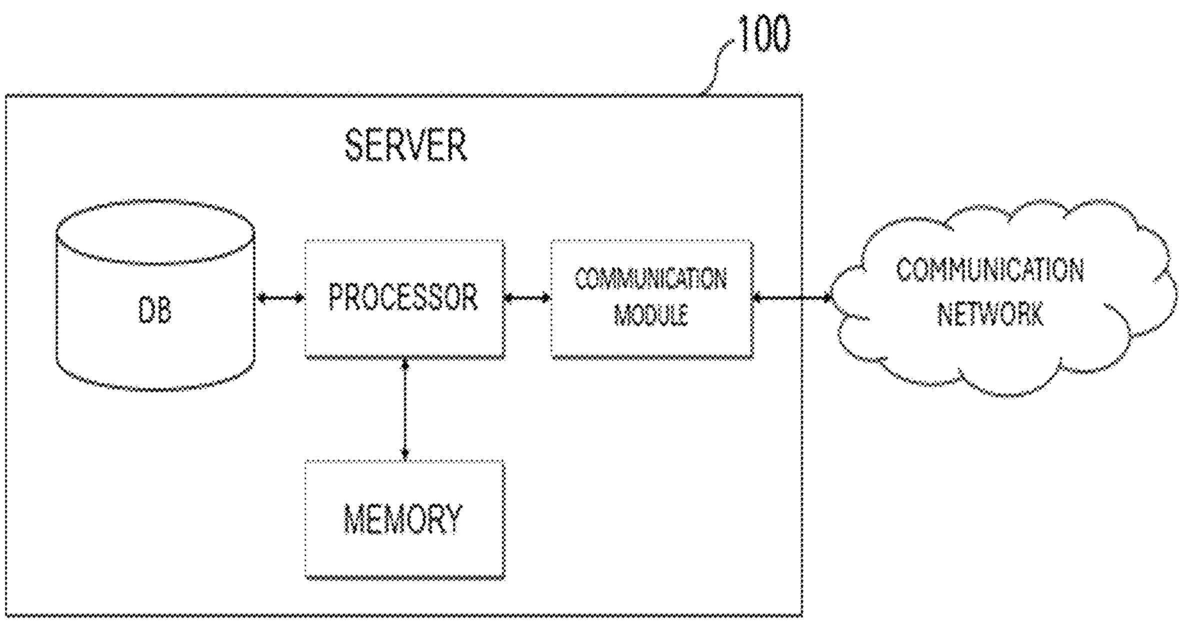
FIG. 2 is a block diagram showing an internal configuration of a server according to an embodiment of the present disclosure.

As shown in FIG. 2, the server 100 according to an embodiment of the present disclosure may be composed of a memory that stores a program (or application) configured to perform the method for searching for a related patent by using clinical trial design data based on an LLM, a processor that executes the program, and a data base (DB) that stores data for executing the program or application.

Also, the server 100 includes an embedded communication module which is connected to a communication network wired or wirelessly for communication, and the processor may perform various functions as the program stored in the memory is executed. The execution and functions of the program by the processor and the memory will be described in detail below.

The user device 200 is connected to the server 100 wired or wirelessly for communication through the communication network, and may include a laptop computer, a desktop computer, a tablet PC, and a smart phone. The program or application configured to perform the method for searching for a related patent by using clinical trial design data based on an LLM may be installed on the user device 200.

The method for searching for a related patent by using clinical trial design data based on an LLM, which is performed by the system and the server 100, according to an embodiment of the present disclosure includes receiving a clinical trial-related keyword from the user device 200, searching for a plurality of pieces of clinical trial design data based on the related keyword, and providing the searched data by the server 100.

Herein, the clinical trial-related keyword refers to a word or term extracted from report files, image files, and video files directly input to the server 100 from the user device 200, or a keyword related to a specific clinical trial and input from the user device 200. The clinical trial-related keyword include, for example, a disease name, a medical term indicating a progression level, a medical terms related to control and test groups, medical terms related to efficacy and safety, and as legal terms related to clinical trial ethics.

According to an another embodiment of the present disclosure, when report files, image files, and video files are input to the server 100 from the user device 200, the server 100 may extract text from those files by Optical Character Recognition (OCR) and extract a word or term that appears more than a predetermined number of times in the extracted text.

In the method for searching for a related patent by using clinical trial design data based on an LLM according to an embodiment of the present disclosure, before the above-described process is performed, the server 100 receives a plurality of pieces of patent document data about a clinical trial from the user device 200, extracts a query information string including a clinical trial title, a disease name, information about a clinical trial phase, clinical trial patient recruitment criteria, and clinical trial patient group design information, and a response information string including claims of a patent document, description of the invention of the patent document, patent bibliographic data, and a patent number from the plurality of pieces of patent document data, generates a prompt command by using the pre-stored query text 110, the query information string, and the response information string, matches the prompt command with the query information string and the response information string to create a training dataset, and adjusts parameters of the LLM by training the LLM with the training set.

Also, validation may be further performed by setting patent document data for validation as a separate validation dataset among the plurality of pieces of patent document data set by a user, training the LLM with the validation dataset, and adjusting the parameters of the LLM.

To this end, the LLM of the present disclosure is trained to output related patent information for respective sections when the query text 110 and an extracted patent search keyword string 120 are input. According to various embodiments of the present disclosure, various LLMs can be used, such as OpenAI's ChatGPT or GPT-3, Google's Bard or Turing NLG, and META's LaMDA or Llama.

Therefore, the LLM of the present disclosure does not use a large language model disclosed in the prior art, but rather involves performing fine-tuning (parameter adjustment) for the efficient use of the LLM. Accordingly, the LLM of the present disclosure is trained and controlled to derive superior results compared to general large language models.

Also, the server 100 may extract, as clinical trial design data, report files, image files, and video files on a plurality of clinical trials collected via internet crawling based on the clinical trial-related keyword input from the user device 200, and may provide the extracted clinical trial design data to the user device 200.

Through this process, the user does not directly use the input keyword for search, but extracts a main keyword including valid data from the materials found based on the keyword and uses the main keyword for patent search.

To this end, when one of the plurality of pieces of clinical trial design data is selectively input to the server 100 from the user device 200, the server 100 may provide the user device 200 with detailed information about the selectively input clinical trial design data.

A main keyword categorized according input from the user device 200 may be provided as selected from the detailed information about the clinical trial design data provided to the user device 200. Herein, the category of the main keyword includes a drug name, a Contract Research Organization name, and a disease name.

According to an embodiment of the present disclosure, the server 100 selects a main keyword corresponding to a category input from the user device 200 from among a plurality of main keywords and extracts the main keyword from the detailed information about the clinical trial design data to recommend it to the user device 200, and the user device 200 selectively inputs one of recommended main keywords to determine the selected main keyword as a main keyword used for patent search.

The server 100 pre-processes the extracted main keyword, combines a plurality of pieces of pre-stored query text 110 to generate and add a plurality of pieces of final query text, and inputs the final query text to the LLM to search for and collect a plurality of related patents.

Figure 3:
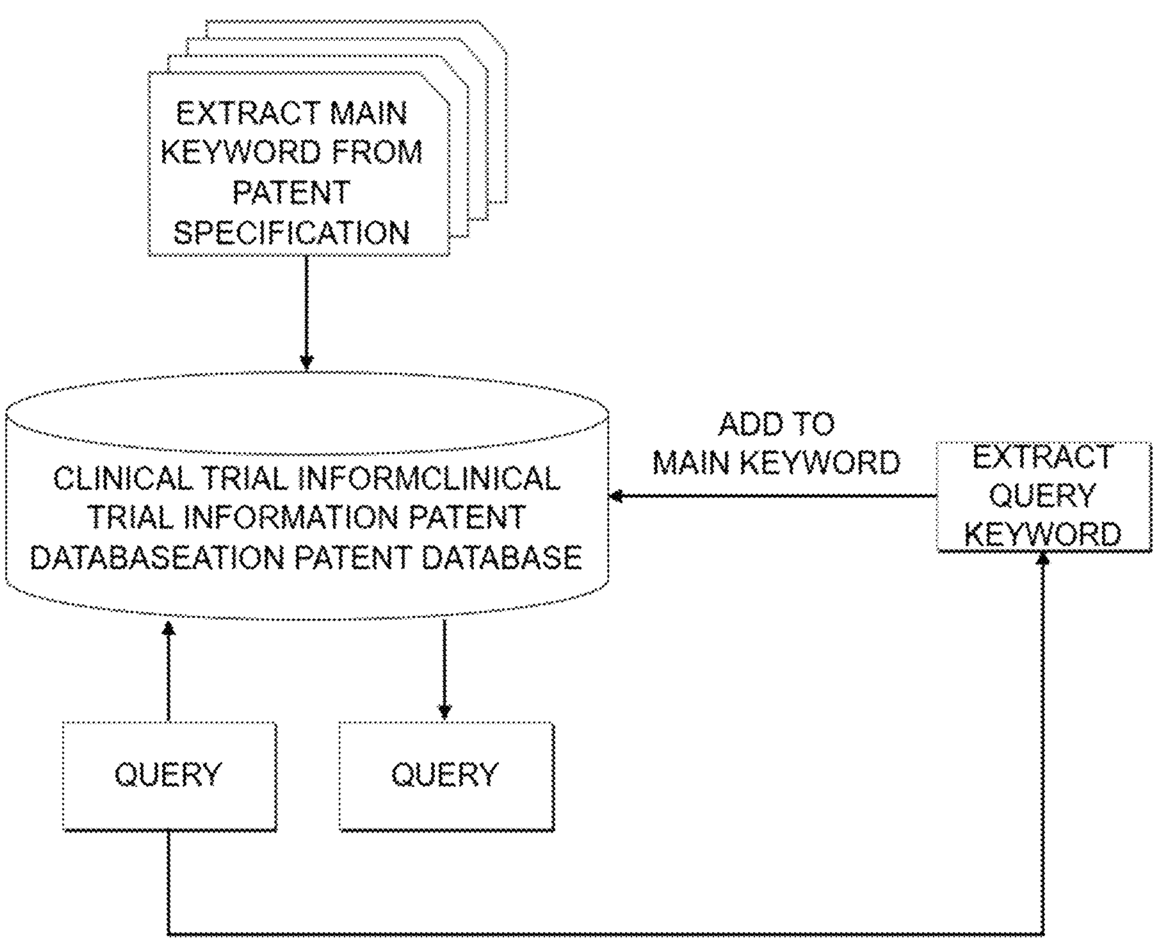
FIG. 3 is a block diagram showing operations in a method for searching for a related patent by using clinical trial design data based on an LLM according to an embodiment of the present disclosure.

As shown in FIG. 3, the extracted final query text may be stored in the DB of the server 100.

Herein, in the pre-processing performed by the server 100, a special character is removed from a string including the main keyword, and if the string including the main keyword contains English characters, capital letters are converted into small letters and the string is extracted as the patent search keyword string 120.

Also, if the category of the main keyword is input from the user device 200, the server 100 analyzes a meaning of a string even when the user device 200 inputs a plurality of strings without spaces, extracts main keywords corresponding to a title, a drug name, formulation, a target disease, and a clinical trial phase, respectively, from the string, and provides the user device 200 with the strings with line spacing to distinguish categories of the title, the drug name, the formulation, the target disease, and the clinical trial phase, respectively, to query again whether it has been intended by the user.

The final query text is implemented in the form of a prompt command and includes the query text 110 and a main keyword. Herein, the query text 110 is located before the main keyword.

This is to maximize the efficiency of the LLM. Considering that most of the developers of large language models are based in English-speaking countries, it is described as a head-first sentence (main point, i.e., command, first, followed by detailed conditions) according to the English word order.

Referring to FIG. 4, the query text 110 consists of a query or command to search for a patent with specific contents by using the clinical trial main keyword, which sequentially lists information input by the user.

Based on an output value generated after the final query text is input to the LLM, the server 100 generates a report in which the plurality of related patents collected is output for a plurality of sections 210, respectively, and provides the report to the user device 200.

Referring to FIG. 5, the sections 210 in the report include a filing country, an invention name, an application number, an application date, and an applicant.

As shown in FIG. 5, the report generated according to an embodiment of the present disclosure may provide specific information for a plurality of patent documents organized by section in the form of a list. If information of any one of the patent documents in the list is selected, the full text of the selected patent document may also be provided.

The report generated by the server 100 is provided to the user device 200 in a program format that allows for editing and saving on a webpage or application. Thus, the report can be edited by the user device 200.

According to yet another embodiment of the present disclosure, if the report is edited in the program that allows for editing and saving, the server 100 may compare the provided report draft with the edited version from the user device 200 and perform additional training or adjustment of the LLM with the difference therebetween as a part of the dataset. Thus, the LLM may output responses tailored to needs of the user device 200.

Figure 6:
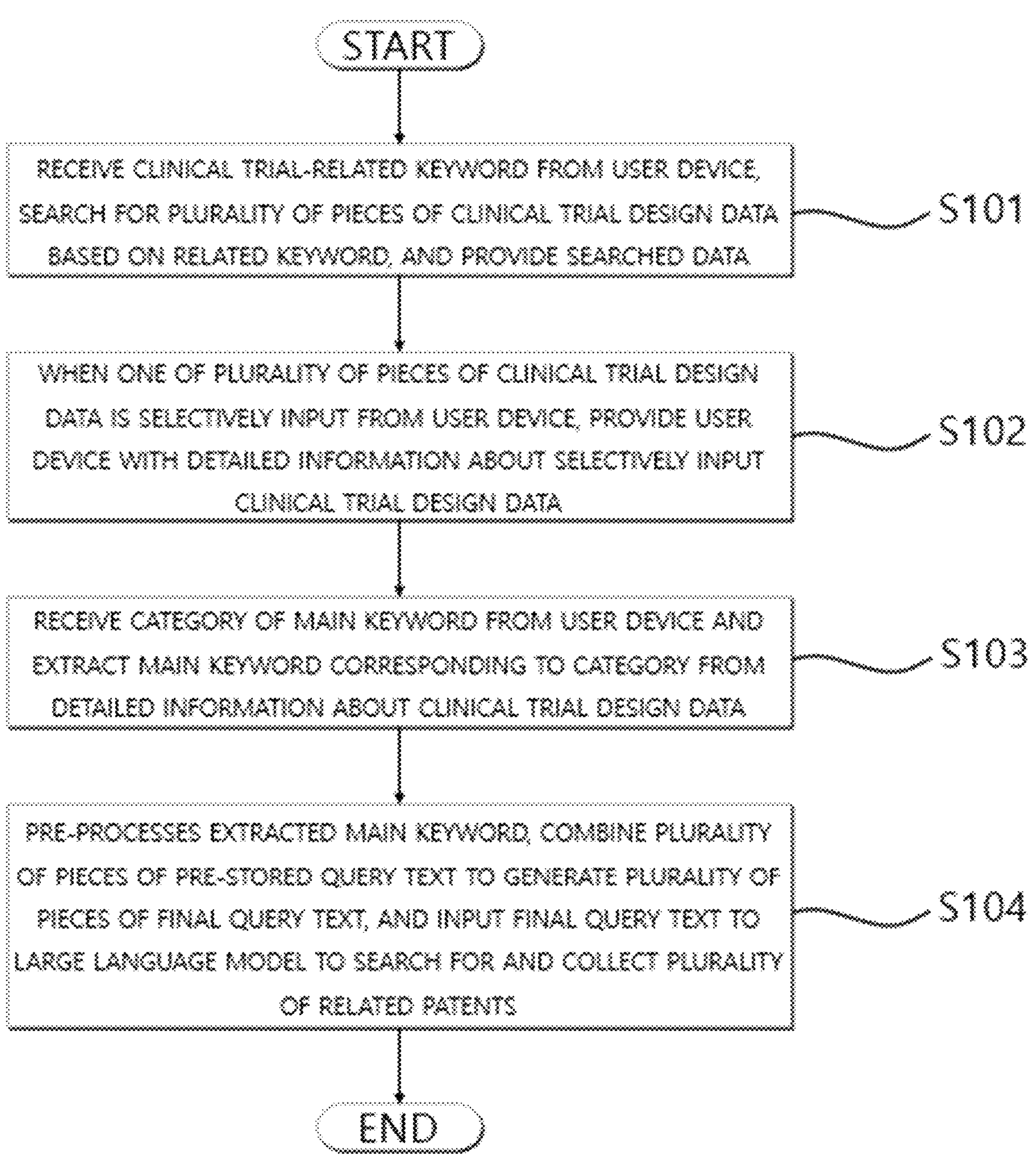
FIG. 6 is a flowchart showing the method for searching for a related patent by using clinical trial design data based on an LLM according to an embodiment of the present disclosure.

Hereafter, the method for searching for a related patent by using clinical trial design data based on an LLM, which is performed by the server 100, according to an embodiment of the present disclosure will be described again with reference to FIG. 6.

First, the server 100 receives a clinical trial-related keyword from the user device 200, searches for a plurality of pieces of clinical trial design data based on the related keyword, and provides the searched data (S101).

When one of the plurality of pieces of clinical trial design data is selectively input from the user device 200, the server 100 provides the user device 200 with detailed information about the selectively input clinical trial design data (S102).

Then, the server 100 receives a category of a main keyword from the user device 200 and extracts a main keyword corresponding to the category from the detailed information about the clinical trial design data (S103).

Thereafter, the server 100 pre-processes the extracted main keyword, combines the plurality of pieces of pre-stored query text 110 to generate a plurality of pieces of final query text, and inputs the final query text to the LLM to search for and collect a plurality of related patents (S104).

Then, the server 100 generates a report in which the plurality of related patents collected is output for a plurality of sections, respectively, and provides the report to the user device 200 (S105).

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The method and system of the present disclosure have been explained in relation to a specific embodiment, but their components or a part or all of their operations can be embodied by using a computer system having general-purpose hardware architecture.

The above description of the present disclosure is provided for the purpose of illustration, and it would be understood by a person with ordinary skill in the art that various changes and modifications may be made without changing technical conception and essential features of the present disclosure. Thus, it is clear that the above-described examples are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

Explanation of Codes

100: Server
110: Query text
120: Patent search keyword string
200: User device
210: Section

What is claimed is:

1. A method for searching for a related patent by using clinical trial design data based on a large language model (LLM), which is performed by a server, comprising:

(a) receiving a clinical trial-related keyword from a user device, searching for a plurality of pieces of clinical trial design data based on the clinical trial-related keyword, and providing the plurality of pieces of clinical trial design data, wherein before performing process (a), (a-1) receiving a plurality of pieces of patent document data about a clinical trial from the user device;

(a-2) extracting a query information string including a clinical trial title, a disease name, information about a clinical trial phase, clinical trial patient recruitment criteria, and clinical trial patient group design information, and a response information string including claims of a patent document, description of an invention of the patent document, patent bibliographic data, and a patent number from the plurality of pieces of patent document data, and generating a prompt command by using a pre-stored query text, the query information string, and the response information string;

(a-3) matching the prompt command with the pre-stored query text, the query information string and the response information string to create a training dataset and adjusting parameters of the LLM by training the LLM with the training dataset; and (a-4) performing validation by setting patent document data for validation as a separate validation dataset among the plurality of pieces of patent document data set by a user, training the LLM with the separate validation dataset, and adjusting the parameters of the LLM;

(b) when one of the plurality of pieces of clinical trial design data is selectively input from the user device, providing the user device with detailed information about the one of the plurality of pieces of clinical trial design data;

(c) receiving a category of a main keyword from the user device and extracting the main keyword corresponding to the category from the detailed information about the clinical trial design data;

(d) pre-processing the extracted main keyword, combining a plurality of pieces of pre-stored query text to generate a plurality of pieces of final query text, and inputting the final query text to the LLM to search for and collect a plurality of related patents; and (e) generating a report in which the plurality of related patents collected is output for a plurality of sections, respectively, and providing the report to the user device.

2. The method of claim 1, wherein the clinical trial design data includes report files, image files, and video files directly input from the user device, or report files, image files, and video files on a plurality of clinical trials collected via internet crawling based on the clinical trial-related keyword from the user device.

3. The method of claim 1, wherein the process (d) comprises:

removing a special character from a string including the main keyword, and if the string including the main keyword contains English characters, converting capital letters into small letters and extracting the string as a patent search keyword string.

4. The method of claim 3, wherein the category of the main keyword includes a drug name, a Contract Research Organization name, and a disease name.

5. The method of claim 4, wherein process (c) comprises:

receiving the category of the main keyword from the user device, extracting the main keyword corresponding to the category from the detailed information about the clinical trial design data to recommend it to the user device, providing, to the user device, the main keyword for patent search, and receiving, from the user device, the main keyword for patent search in confirmation thereof by the user device.

6. The method of claim 1, wherein the plurality of sections includes a filing country, an invention name, an application number, an application date, and an applicant.

7. The method of claim 1, wherein in process (e), the generated report is provided in a program format that allows for editing and saving on a webpage or application.

8. The method of claim 1, wherein the prompt command includes query text and a clinical trial main keyword, and the query text is located before the clinical trial main keyword.

9. The method of claim 8, wherein the query text consists of a query or command to search for a patent with specific contents by using the clinical trial main keyword, which sequentially lists information input by the user.

10. The method of claim 9, wherein process (c) further comprises:

analyzing a meaning of a string even when the user device inputs a plurality of strings without spaces, extracting the main keyword corresponding to a title, a drug name, formulation, a target disease, or the clinical trial phase from the string, and providing the user device with the string with line spacing to distinguish categories of the title, the drug name, the formulation, the target disease, or the clinical trial phase.

11. A server for searching for a related patent by using clinical trial design data based on an LLM, comprising:

a memory that stores a program configured to perform a method for searching for the related patent by using the clinical trial design data based on the LLM; and a processor that executes the program, wherein the method includes:

(a) receiving a clinical trial-related keyword from a user device, searching for a plurality of pieces of clinical trial design data based on the clinical-trial-related keyword, and providing the plurality of pieces of clinical trial design data, wherein before performing process (a), (a-1) receiving a plurality of pieces of patent document data about a clinical trial from the user device;

(a-2) extracting a query information string including a clinical trial title, a disease name, information about a clinical trial phase, clinical trial patient recruitment criteria, and clinical trial patient group design information, and a response information string including claims of a patent document, description of an invention of the patent document, patent bibliographic data, and a patent number from the plurality of pieces of patent document data, and generating a prompt command by using a pre-stored query text, the query information string, and the response information string;

(a-3) matching the prompt command with the query information string and the response information string to create a training dataset and adjusting parameters of the LLM by training the LLM with the training dataset; and (a-4) performing validation by setting patent document data for validation as a separate validation dataset among the plurality of pieces of patent document data set by a user, training the LLM with the separate validation dataset, and adjusting the parameters of the LLM;

(b) when one of the plurality of pieces of clinical trial design data is selectively input from the user device, providing the user device with detailed information about the selectively input clinical trial design data;

(c) receiving a category of a main keyword from the user device and extracting a main keyword corresponding to the category from the detailed information about the clinical trial design data;

(d) pre-processing the extracted main keyword, combining a plurality of pieces of pre-stored query text to generate a plurality of pieces of final query text, and inputting the final query text to the LLM to search for and collect a plurality of related patents; and (e) generating a report in which the plurality of related patents collected is output for a plurality of sections, respectively, and providing the report to the user device.

* * * * *